US009253657B2

(12) United States Patent
Hoshihara et al.

(10) Patent No.: US 9,253,657 B2
(45) Date of Patent: Feb. 2, 2016

(54) WIRELESS COMMUNICATION DEVICE AND WIRELESS COMMUNICATION SYSTEM

(75) Inventors: Yasunori Hoshihara, Tokyo (JP); Hisao Nakano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 226 days.

(21) Appl. No.: 13/822,600

(22) PCT Filed: Jan. 28, 2011

(86) PCT No.: PCT/JP2011/000471
§ 371 (c)(1),
(2), (4) Date: Mar. 12, 2013

(87) PCT Pub. No.: WO2012/101679
PCT Pub. Date: Aug. 2, 2012

(65) Prior Publication Data
US 2013/0184020 A1 Jul. 18, 2013

(51) Int. Cl.
*H04W 24/02* (2009.01)
*H04W 72/08* (2009.01)
*H04W 16/14* (2009.01)

(52) U.S. Cl.
CPC ............ *H04W 24/02* (2013.01); *H04W 72/082* (2013.01); *H04W 16/14* (2013.01)

(58) Field of Classification Search
USPC ........ 455/501, 41.2, 63.13, 63.1, 67.3, 67.11, 455/62, 118, 313
See application file for complete search history.

(56) References Cited

U.S. PATENT DOCUMENTS

| 7,664,465 B2* | 2/2010 | Shen | H04L 1/0002 370/252 |
| 7,983,216 B2* | 7/2011 | Iyer | H04W 16/10 370/329 |

(Continued)

FOREIGN PATENT DOCUMENTS

| CN | 101789933 A | 7/2010 |
| JP | 2003-199160 A | 7/2003 |

(Continued)

OTHER PUBLICATIONS

"IEEE Standard for Information technology—Telecommunications and information exchange between systems—Local and metropolitan area networks—Specific requirements Part 11: Wireless LAN Medium Access Control (MAC) and Physical Layer (PHY) Specifications" IEEE Computer Society, Jun. 12, 2007.

(Continued)

*Primary Examiner* — Edward Urban
*Assistant Examiner* — Ralph H Justus
(74) *Attorney, Agent, or Firm* — Birch, Stewart, Kolasch & Birch, LLP

(57) ABSTRACT

A wireless communication device includes first wireless communication unit 2 for performing wireless communication with information terminal 21 through wireless LAN, and for obtaining frequency channel of interference wave by detecting interference wave due to wireless communication through wireless LAN between information terminal 24 and portable information terminal 25; second wireless communication unit 3, third wireless communication unit 4, . . . , nth wireless communication unit 5 for performing wireless communication with mobile terminal 22 or wireless headphone 23 by Bluetooth or wireless audio; channel aggregation unit 10 for setting the frequency channel of first wireless communication unit 2 at the same frequency channel as the frequency channel of interference wave the first wireless communication unit 2 obtains; and assignment control unit 9 for allocating frequency channels of the second, third, . . . , nth wireless communication units 3, 4, 5 at frequency channels other than frequency channel the channel aggregation unit 10 sets.

4 Claims, 11 Drawing Sheets

(56) References Cited

U.S. PATENT DOCUMENTS

| | | | |
|---|---|---|---|
| 8,780,879 B2* | 7/2014 | Tomita et al. | 370/344 |
| 2006/0079183 A1* | 4/2006 | Song | H04W 16/10 455/63.1 |
| 2006/0188004 A1 | 8/2006 | Kizu et al. | |
| 2006/0281408 A1 | 12/2006 | Grushkevich | |
| 2008/0200195 A1* | 8/2008 | Abe | H04W 16/14 455/501 |
| 2009/0097445 A1* | 4/2009 | Moelker | H04W 16/14 370/329 |
| 2009/0286481 A1* | 11/2009 | Abraham | H04W 72/1231 455/63.1 |
| 2010/0041358 A1 | 2/2010 | Wood | |
| 2010/0120362 A1 | 5/2010 | Walley et al. | |
| 2010/0296496 A1* | 11/2010 | Sinha | H04W 12/12 370/338 |
| 2012/0087341 A1* | 4/2012 | Jang | H04W 28/04 370/331 |

FOREIGN PATENT DOCUMENTS

| | | |
|---|---|---|
| JP | 2006-211242 A | 8/2006 |
| JP | 2007-243765 A | 9/2007 |
| JP | 2008-172556 A | 7/2008 |
| JP | 2009-534890 A | 9/2009 |
| JP | 2009-246901 A | 10/2009 |
| JP | 2010-278764 A | 12/2010 |
| WO | 2007/122188 A1 | 11/2007 |

OTHER PUBLICATIONS

"Master Table of Contents & Compliance Requirements", Bluetooth Specification Version 3.0 + HS [vol. 0], Apr. 21, 2009.

* cited by examiner

FIG.4
(a)
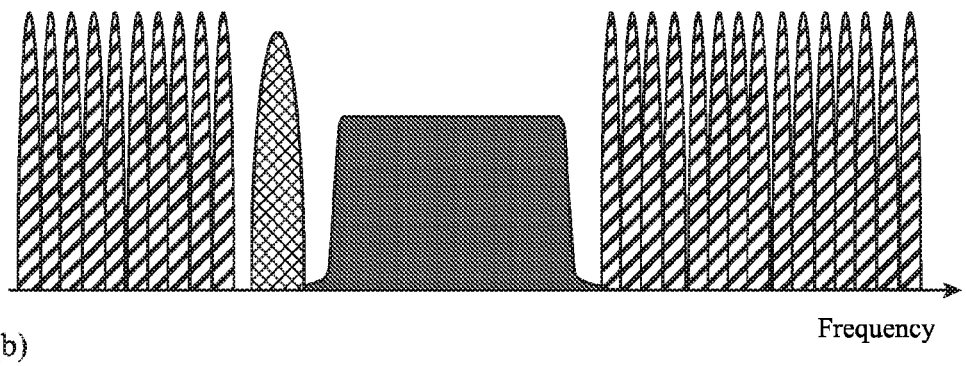
(b)
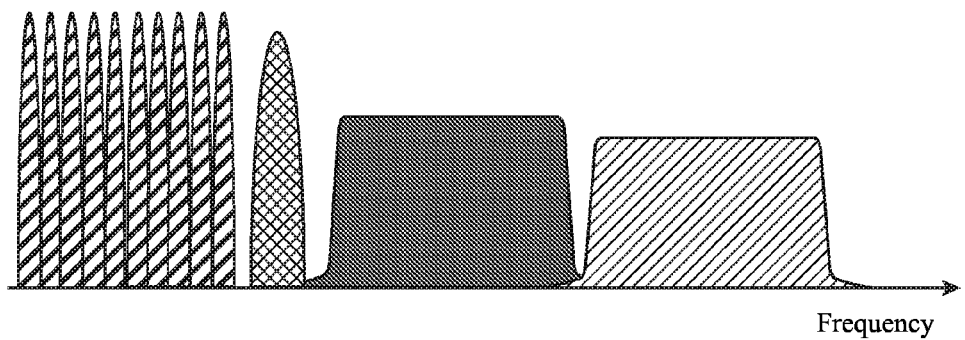
(c)
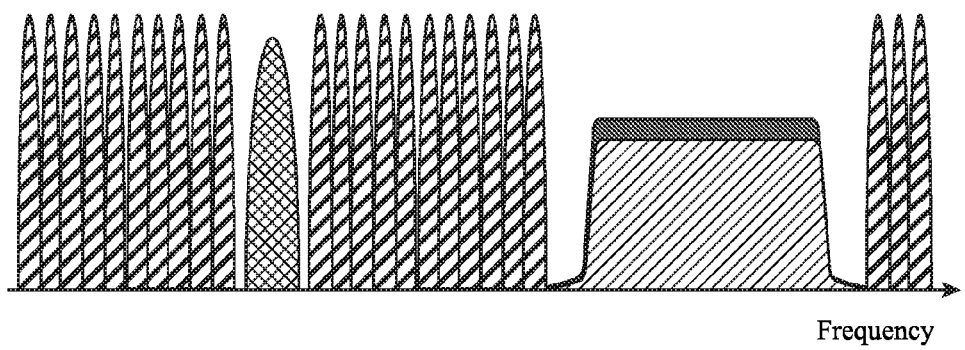
Frequency
▓ : First Wireless Communication Unit (Wireless LAN)
▨ : Interference Wireless LAN
▨ : Second Wireless Communication Unit (Bluetooth)
▨ : Third Wireless Communication Unit (Wireless Audio)

WIRELESS COMMUNICATION DEVICE AND WIRELESS COMMUNICATION SYSTEM

TECHNICAL FIELD

The present invention relates to a wireless communication device and a wireless communication system which allocate a plurality of wireless communication means incorporating a plurality of wireless communication schemes that use the same frequency band to the optimum frequency channels.

BACKGROUND ART

Recently, with the development of wireless communication technology, onboard information equipment typified by a car navigation system has offered user applications that adopt various wireless technology. As an instance, there are a lot of examples such as payment of a fee using an ETC (Electronic Toll Collection System: a registered trademark, the mention of which will be omitted from now on), an in-vehicle wireless communication system for connecting between user equipment like a Bluetooth/wireless LAN and onboard information equipment or between two or more pieces of onboard information equipment, an outside-vehicle wireless communication system employing mobile phone/wireless LAN (Local Area Network), and a dedicated onboard wireless audio transmission system. In addition, a rate of installation of user applications adopting the wireless technology into onboard information equipment is increasing.

When different schemes with nearby frequencies are mixed in a wireless communication system, communication deterioration can occur because of radio interference, that is, because radio waves used in different wireless systems each appear as noise. In particular, a wireless LAN or Bluetooth (registered trademark: it is also applied to the drawings, the mention of which will be omitted from now on) which is incorporated into a lot of products such as a mobile phone, notebook computer and game machine employs a frequency channel of 2.4 GHz band.

FIG. 11 shows a frequency channel arrangement of a wireless LAN and Bluetooth. These frequency channel arrangements are defined in reference 1 and reference 2 shown below, and frequency channels used are determined in accordance with operations in each country. The 2.4 GHz band, which is called ISM (Industrial, Scientific and Medical) band, is under lenient operation regulations compared with the other frequency band and does not require a radio station license. Accordingly, it is widely used by a small power wireless data communication system, and is used for a household microwave oven or medical equipment in addition to communication.

Reference 1: IEEE-Std. 802.11™-2007 IEEE Standard for Information technology—Telecommunications and information exchange between systems—Local and metropolitan area networks—Specific requirements Part 11: Wireless LAN Medium Access Control (MAC) and Physical Layer (PHY) Specifications.

Reference 2: BLUETOOTH SPECIFICATION Version 3.0+HS.

A wireless LAN, Bluetooth and other wireless communication schemes used in the 2.4 GHz band have their own unique interference avoidance functions. For example, the wireless LAN, which has a CSMA/CA (Carrier Sense Multiple Access with Collision Avoidance) function, decides on whether the frequency band it uses is occupied by any other wireless device by actually measuring a used state of the radio wave, and avoids an interference or collision with the other wireless LAN device or other wireless device with other wireless communication scheme by carrying out communication when it decides that no other wireless device uses the frequency band. In a domain where the frequency band it uses is occupied by the other wireless LAN device or wireless device with other wireless communication scheme, since the ratio of being able to occupy it for its own communication reduces, the transmission efficiency of the communication reduces.

As for the Bluetooth, although it carries out spread spectrum communication by executing frequency hopping, it avoids the interference by measuring the communication state of each hopping frequency using the AFH (Adaptive Frequency Hopping) function, and by removing a frequency with a bad communication state due to radio interference or the like from the hopping frequencies to prevent using it. However, since the number of the hopping frequencies has a lowest limit, when a large percentage of the frequency band used undergoes interference, the communication deterioration increases.

In addition, there are many devices recently that incorporate a wireless LAN, Bluetooth and other scheme, which employ the 2.4 GHz band, into a single wireless device. When the plurality of wireless communication schemes installed in the single wireless device are used simultaneously, since the frequency band is the same, unless the configuration is made in such a manner that the frequency channel assignment is made appropriately or time-division multiplexing control is carried out when the frequency channels are used in common, deterioration due to radio interference can occur.

As an interference avoidance method of a wireless device that incorporates a plurality of wireless communication schemes, Patent Document 1, for example, discloses, in a composite wireless device that incorporates both the Bluetooth and wireless LAN, a configuration that prevents the hopping frequencies of the Bluetooth from encountering the carrier sense of the wireless LAN by controlling in such a manner that the hopping frequencies of the Bluetooth are not allocated to the frequency channel used by the wireless LAN and to its neighboring frequencies. Thus, it avoids the interference between the wireless devices within the composite wireless device which includes multiple wireless communication schemes.

In addition, Patent Document 2 discloses, in an onboard communication device that incorporates both the Bluetooth and wireless LAN, an onboard communication device which comprises an in-vehicle communication means for connecting an in-vehicle mobile terminal and the Bluetooth, and an outside-vehicle communication means for connecting a wireless LAN base station outside the vehicle with the wireless LAN, and which optimizes, when an occurrence of wireless communication by the outside-vehicle communication means is expected, the frequency the in-vehicle communication means will use in the wireless communication so as not to include the particular frequency the outside-vehicle communication means uses.

PRIOR ART DOCUMENT

Patent Document

Patent Document 1: Japanese Patent Laid-Open No. 2008-172556.

Patent Document 2: Japanese Patent Laid-Open No. 2007-243765.

DISCLOSURE OF THE INVENTION

Problems to be Solved by the Invention

In the foregoing Patent Document 1 and Patent Document 2, however, each device prevents its communication quality deterioration by avoiding interference between the wireless units within the wireless device itself by controlling the frequency channels of the wireless device incorporating the plurality of wireless communication schemes. Accordingly, it has a problem of being unable to prevent the communication quality deterioration by avoiding the radio interference from an external wireless device.

Here, consider a case where another wireless device is present in the vehicle and radio interference occurs. Since the wireless communication is carried out in a small closed space of the vehicle, and the wireless devices are near to each other, the levels of the radio interference between them are large. As for the wireless LAN in particular, since its frequency bandwidth used is wider than that of the other wireless communication schemes of the foregoing 2.4 GHz band wireless communication systems, the effect of its radio interference on the other wireless communication scheme is great, and it is expected that the level of the communication quality deterioration is large.

In addition, in the case of the wireless LAN which is used in the small closed space in the vehicle, even if the frequency channels of the wireless LANs are separated from each other, the level of the radio interference between them is large. Thus, according to the CSMA/CA function for the noise floor (noise that spreads to frequency channels other than its own use) at the wireless LAN transmission, a wireless LAN device can make a decision that its own frequency channel is used by another wireless device, and may stop its own communication to avoid interference and/or collision. In this case, the wireless device operates in the direction of reducing the transmission efficiency.

Furthermore, because the frequency channel of the wireless LAN occupies a considerable part of the 2.4 GHz band, the Bluetooth and other wireless devices suffer communication quality deterioration due to radio interference, thereby bringing about reduction of the transmission efficiency because the frequency bandwidth used is restricted as a result. It is a major problem for the wireless communication device that incorporates a plurality of wireless communication schemes to avoid the radio interference from an external wireless device to improve the performance without reducing the transmission efficiency of the individual wireless devices with the wireless communication schemes.

The present invention is implemented to solve the foregoing problems. Therefore it is an object of the present invention to provide a wireless communication device and wireless communication system that can avoid the interference from an external wireless device and prevent the reduction of the transmission efficiency of a wireless communication unit which incorporates a wireless LAN and a plurality of wireless communication schemes using the same frequency band as the wireless LAN, and that is suitable for a small closed space.

Means for Solving the Problems

A wireless communication device in accordance with the present invention comprises a wireless LAN communication unit for carrying out wireless communication with the communication equipment through a wireless LAN, and for detecting an interference wave due to wireless communication through a wireless LAN to obtain a frequency channel of the interference wave; a wireless communication unit for carrying out wireless communication based on a communication scheme using the same frequency band as the frequency band of the communication equipment and the wireless LAN; a channel aggregation unit for setting a frequency channel of the wireless LAN communication unit at the same frequency channel as the frequency channel of the interference wave the wireless LAN communication unit obtains; and an assignment control unit for allocating a frequency channel of the wireless communication unit to a frequency channel other than the frequency channel the channel aggregation unit sets.

Advantages of the Invention

According to the present invention, it can avoid the radio interference from the wireless communication on the external wireless LAN and prevent the reduction of the transmission efficiency of a plurality of wireless communication schemes including the wireless LAN.

BRIEF DESCRIPTION OF THE DRAWINGS

FIG. 4 is a diagram showing aggregation and assignment control of the frequencies of the wireless communication device of the embodiment 1;

BEST MODE FOR CARRYING OUT THE INVENTION

The best mode for carrying out the invention will now be described with reference to the accompanying drawings to explain the present invention in more detail.

Embodiment 1

Figure 1:
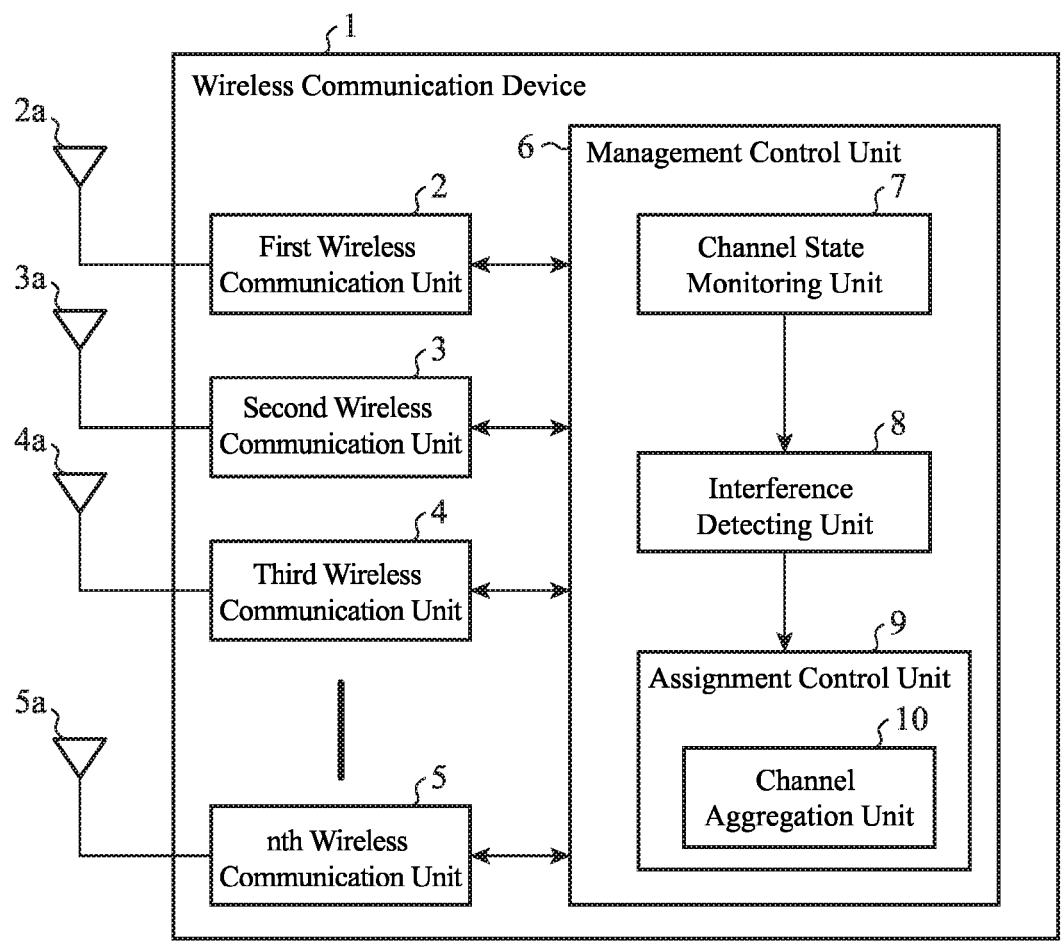
FIG. 1 is a block diagram showing a configuration of a wireless communication device of an embodiment 1.

FIG. 1 is a block diagram showing a configuration of a wireless communication device of an embodiment 1 in accordance with the present invention.

A wireless communication device 1 of an embodiment 1 comprises a first wireless communication unit 2, a second wireless communication unit 3, a third wireless communication unit 4, . . . , an nth wireless communication unit 5, antennas 2a, 3a, 4a and 5a corresponding to the individual wireless communication units, and a management control unit 6 for executing centralized control of the frequency channels of the individual wireless communication units.

The first, second, third, ..., and nth wireless communication units 2, 3, 4 and 5 carry out wireless communication through a wireless LAN and by Bluetooth and wireless communication with a dedicated terminal. The management control unit 6 comprises a channel state monitoring unit 7, an interference detecting unit 8, and an assignment control unit 9 including a channel aggregation unit 10. The channel state monitoring unit 7 obtains the frequency channels the first, second, third, ..., and nth wireless communication units 2, 3, 4 and 5 use at present. When one or more wireless communication units of the first, second, third, ..., and nth wireless communication units 2, 3, 4 and 5, which carry out wireless communication through the wireless LAN, detect an interference wave from an external wireless LAN communication device, the interference detecting unit 8 obtains information about the frequency channel of the interference wave and about the interference wave level, and decides on whether the interference wave level obtained is not less than a prescribed threshold level or not.

When the interference wave level the interference detecting unit 8 obtains is not less than the prescribed threshold level, the channel aggregation unit 10 of the assignment control unit 9 controls in such a manner as to aggregate the frequency channel of the wireless communication unit that carries out the wireless communication through the wireless LAN to the same frequency channel as the frequency of the external wireless LAN communication device which is an interference source. In addition, the assignment control unit 9 notifies one or more wireless communication units carrying out wireless communication other than the wireless LAN of the frequency channel aggregated, and executes assignment control for avoiding the frequency channel aggregated.

Figure 2:
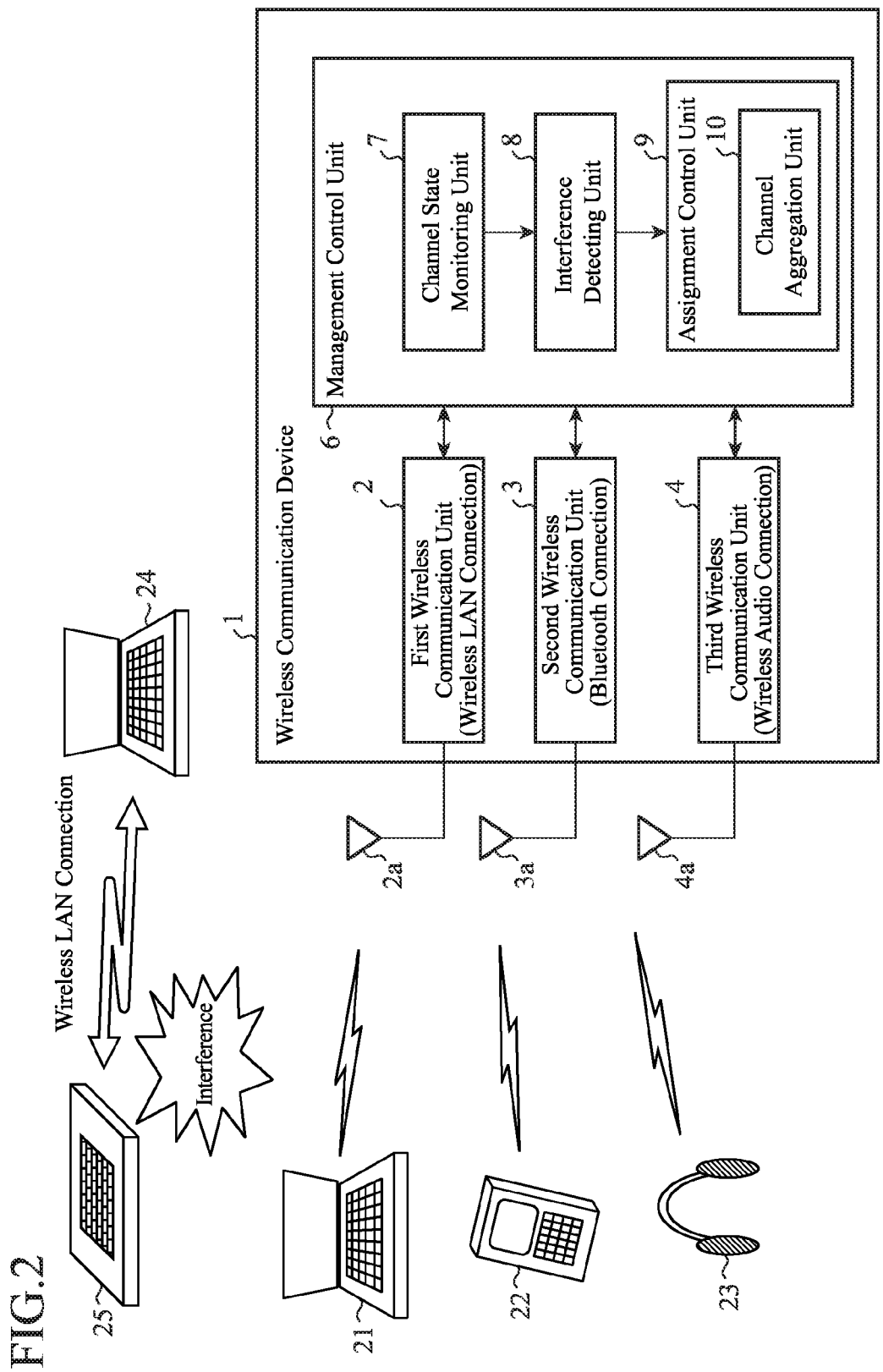
FIG. 2 is a diagram showing an example of application of the wireless communication device of the embodiment 1.

FIG. 2 is a diagram showing an example of application of the wireless communication device of the embodiment 1 in accordance with the present invention. In FIG. 2, assume that the wireless communication device 1 is incorporated into onboard information equipment such as a car navigation (not shown) and is placed in a vehicle. In the vehicle, the first wireless communication unit 2, which executes wireless communication through the wireless LAN, carries out data communication with an information terminal 21 like a PC a passenger brings in. The second wireless communication unit 3, which executes wireless communication by Bluetooth, is connected to a mobile terminal 22 to carry out hands-free telephone communication that is widespread as an in-vehicle application. The third wireless communication unit 4, which executes wireless communication with a wireless headphone 23, reproduces a piece of music of the onboard information equipment. In addition to the wireless communication device 1, an information terminal 24 and a portable information terminal 25 carry out wireless communication through the wireless LAN between them.

Although FIG. 2 shows a configuration in which the first wireless communication unit 2, second wireless communication unit 3 and third wireless communication unit 4 have independent antennas 2a, 3a and 4a, it is also possible to reduce them to a single antenna by connecting the antenna terminals of the first wireless communication unit 2, second wireless communication unit 3 and third wireless communication unit 4 with a combiner/distributor.

Figure 3:
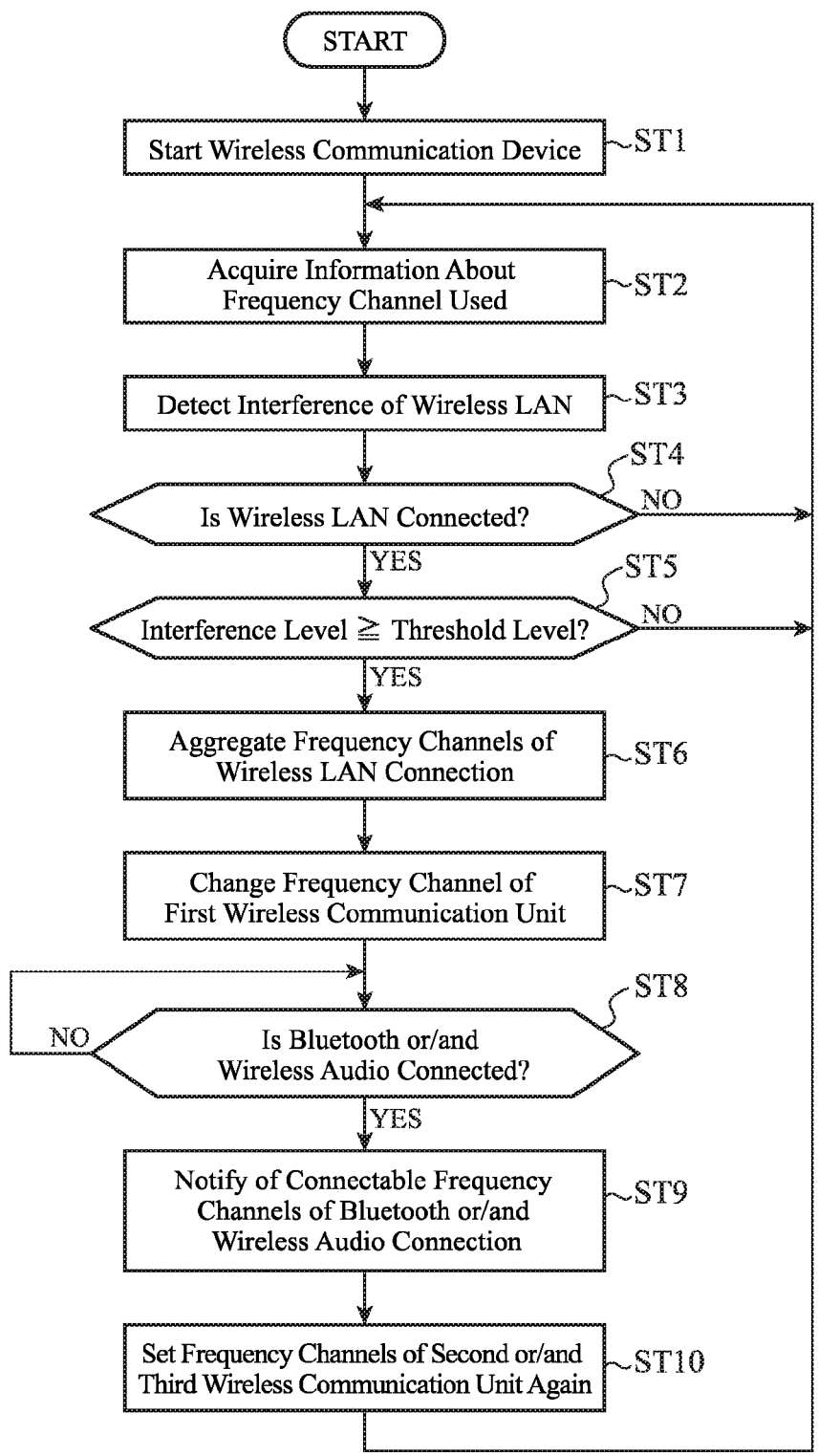
FIG. 3 is a flowchart showing the operation of the wireless communication device of the embodiment 1.

Next, the operation of the wireless communication device 1 will be described with reference to a flowchart of FIG. 3. The flowchart of FIG. 3 shows the operation when the example of application of the wireless communication device 1 shown in FIG. 2 undergoes radio interference from the wireless communication through the wireless LAN between the external information terminal 24 and the portable information terminal 25.

When the wireless communication device 1 is started (step ST1), the channel state monitoring unit 7 of the management control unit 6 obtains the information about the frequency channels the first wireless communication unit 2, second wireless communication unit 3 and third wireless communication unit 4 use (step ST2). The first wireless communication unit 2, which carries out the wireless communication through the wireless LAN, monitors interference from the external wireless communication equipment (the information terminal 24 and portable information terminal 25 in FIG. 2), and notifies, if it detects interference, the interference detecting unit 8 of the interference wave channel of the interference together with the interference wave level information (step ST3).

If the interference wave is detected at step ST3, the interference detecting unit 8 makes a decision as to whether the first wireless communication unit 2 is in wireless LAN connection (step ST4). If a decision is made at step ST4 that the first wireless communication unit 2 is not in connection, the processing returns to step ST2. On the other hand, if a decision is made at step ST4 that the first wireless communication unit 2 is in connection, the interference detecting unit 8 decides on whether the interference wave level detected is not less than the prescribed threshold level or not (step ST5). If a decision is made at step ST5 that the interference wave level is less than the prescribed threshold level, the processing returns to step ST2. On the other hand, if a decision is made at step ST5 that the interference wave level is not less than the prescribed threshold level, the channel aggregation unit 10 generates a control instruction to aggregate the frequency channel of the first wireless communication unit 2 to the same frequency channel as the frequency channel of the external wireless communication equipment (information terminal 24 and portable information terminal 25) which is the interference source, and supplies it to the first wireless communication unit 2 (step ST6). The first wireless communication unit 2 alters its frequency channel to the frequency channel instructed at step ST6 (step ST7).

Furthermore, the assignment control unit 9 makes a decision as to whether the wireless communication by the Bluetooth or/and wireless audio is in connection in the second wireless communication unit 3 or/and third wireless communication unit 4 (step ST8). Incidentally, the processing at step ST8 is repeated until the connection of the wireless communication of the second wireless communication unit 3 or/and third wireless communication unit 4 is detected. If a decision is made at step ST8 that the wireless communication is in connection, the assignment control unit 9 notifies the second wireless communication unit 3 or/and third wireless communication unit 4 of the frequency channels aggregated by the channel aggregation unit 10 at step ST6, and allocates the frequency channels other than the frequency channels aggregated as a connectable frequency channel (step ST9). According to the allocation at step ST9, the second wireless communication unit 3 or/and third wireless communication unit 4 reestablishes the frequency channel (step ST10). After that, the processing returns to step ST2 of the flowchart to repeat the foregoing processing.

FIG. 4 is a diagram illustrating aggregation and assignment control of the frequencies of the wireless communication device of the embodiment 1 in accordance with the present invention. FIG. 4(a) shows a case which is free from the radio interference by the external wireless communication equipment; FIG. 4(b) shows a result of receiving the radio interference from the external wireless communication equipment and of carrying out the conventional interference avoidance processing by the individual wireless communication units, that is, a result of the independent interference avoidance processing; and FIG. 4(c) shows a result that the management control unit 6 carries out the aggregation of the frequency channels and assignment control of the frequency channels.

Figure 11:
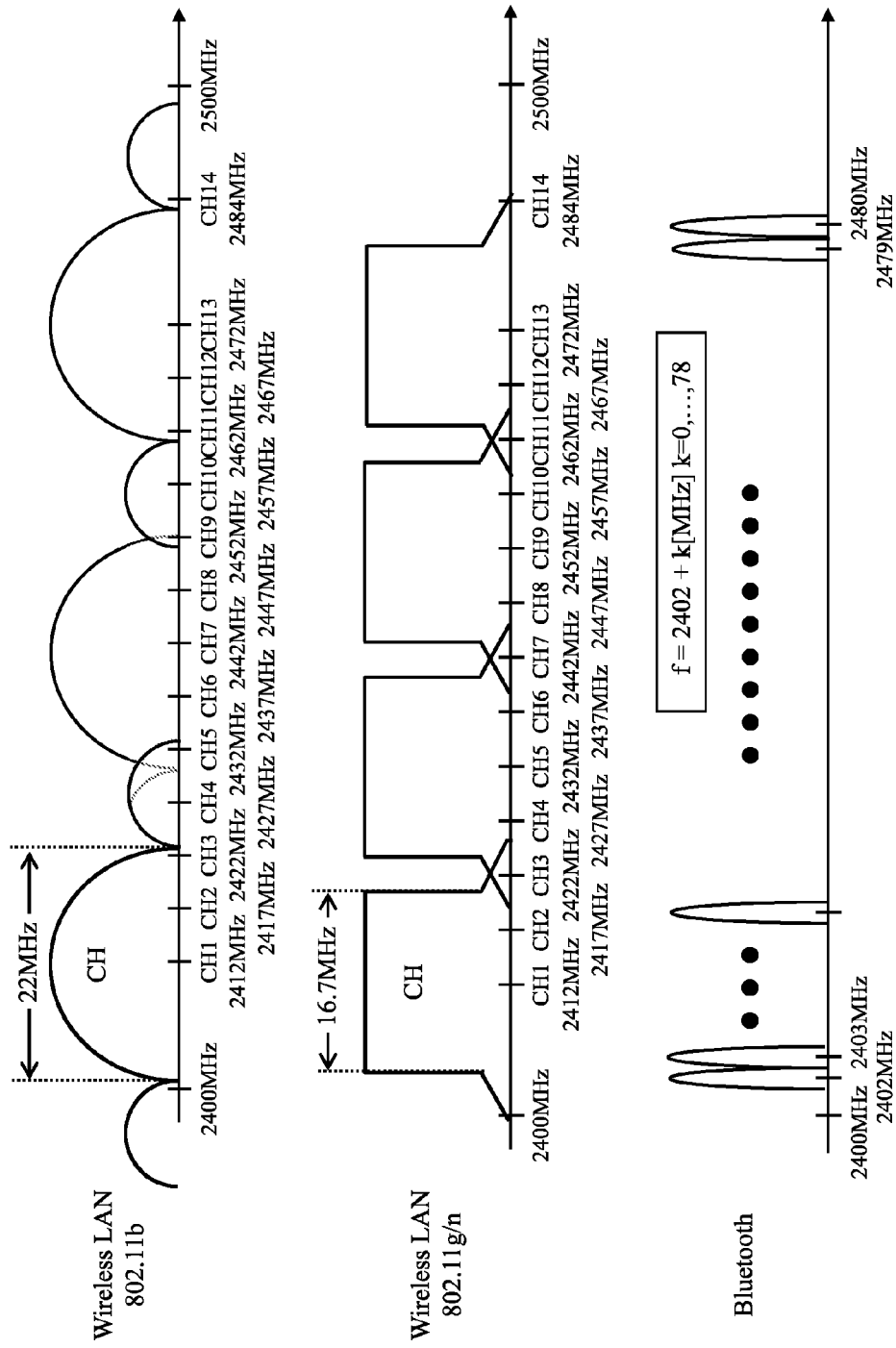
FIG. 11 is a diagram showing a frequency channel arrangement of a wireless LAN and Bluetooth.

FIG. 4(a) shows an allocation example of the frequency channels of the wireless communication device 1 when not receiving radio interference from the external wireless communication equipment. As for the wireless LAN connection by the first wireless communication unit 2, it carries out communication by occupying the frequency band of about 20 MHz per channel (see FIG. 11). As for the Bluetooth connection by the second wireless communication unit 3, it carries out spread spectrum communication by repeating frequency hopping at a period of 625 μsec for signals with a frequency width of 1 MHz (total of 79 channels) within a frequency range from 2.402 GHz to 2.480 GHz. As for the wireless audio connection by the third wireless communication unit 4, it establishes its own use frequency channel and carries out its operation.

Next, a case where the first wireless communication unit 2, second wireless communication unit 3 and third wireless communication unit 4 carry out the interference avoidance processing independently will be described with reference to FIG. 4(b).

First, when the first wireless communication unit 2 allocates the frequency channel of the wireless communication through the wireless LAN so as not to coincide with the frequency channel of the external wireless communication equipment (information terminal 24 and portable information terminal 25 in FIG. 2) which is the interference source, the second wireless communication unit 3 which carries out wireless communication by Bluetooth removes frequency channels, which have their communication states deteriorated because of the interference from the external wireless communication equipment, from the hopping frequency list by the AFT function, and carries out its own allocation of the frequency channels. Likewise, the third wireless communication unit 4 which carries out wireless communication by wireless audio allocates its own frequency channels while avoiding the frequency channels of the external wireless communication equipment. Thus, as shown in FIG. 4(b), the frequency band that can be used by the second wireless communication unit 3 and third wireless communication unit 4 reduces, and the communication state is apt to fluctuate with variations of the radio wave receiving level depending on the frequency channels and on the positions of the antennas 3a and 4a because of the effect of multiple reflection of the radio waves in the small closed space in the vehicle, for example, which is likely to bring about communication deterioration.

Figure 5:
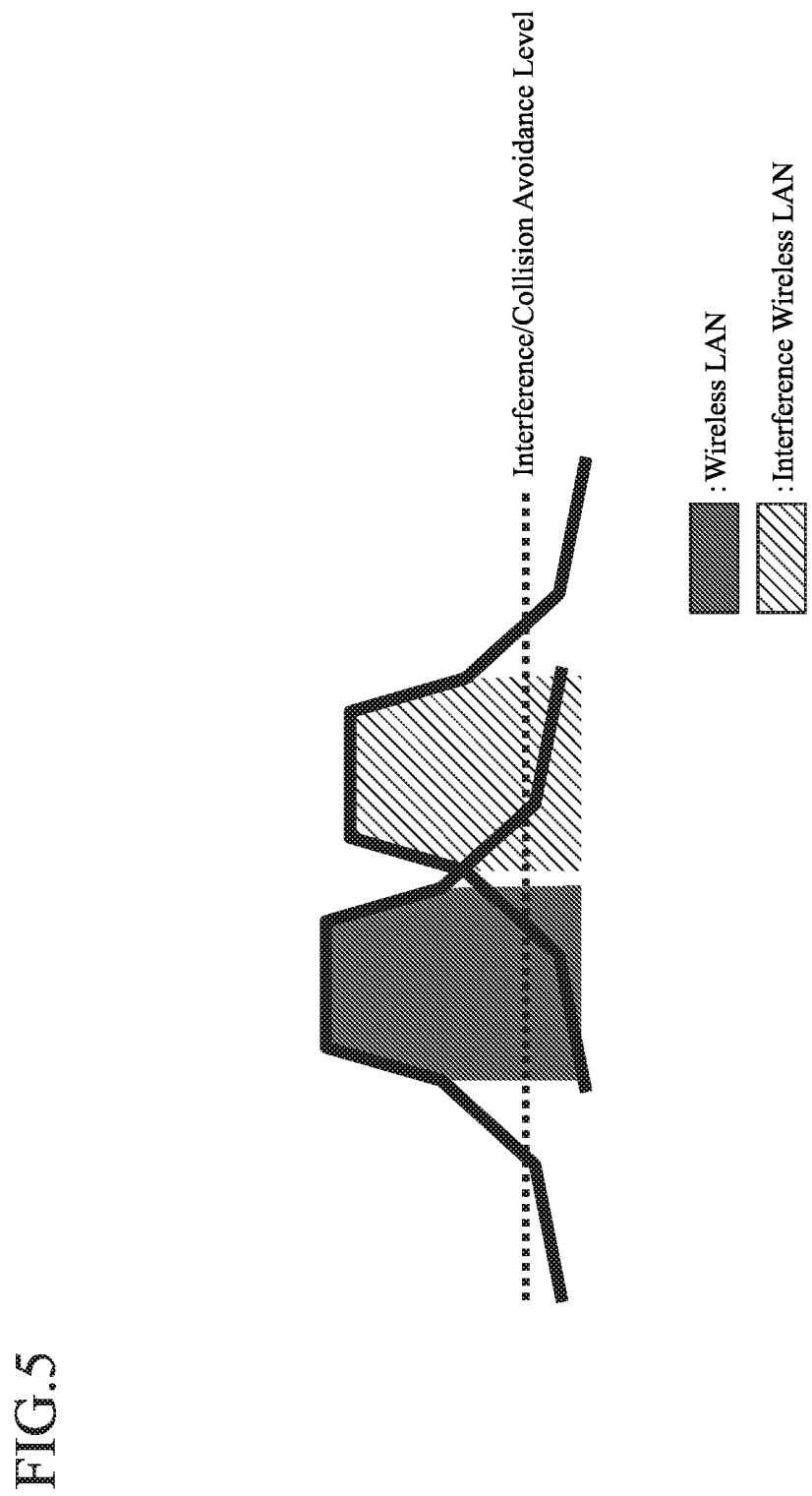
FIG. 5 is a diagram illustrating interference of a wireless LAN connection.

In addition, as for the wireless communication through the wireless LAN of the first wireless communication unit 2, even if it allocates its frequency channel so as not to coincide with the frequency channel of the external wireless communication equipment which is the interference source, since the distance between the wireless communication units of them are short in the small closed space in the vehicle or the like, the level of the interference is large so that the noise floor level at the communication connection by the wireless LAN is high as shown in FIG. 5. This will cause the first wireless communication unit 2 to decide according to the carrier sense function of the wireless LAN that its own use frequency channel is being used by the external wireless communication equipment, and to stop the communication, thereby lowering the transmission efficiency.

To solve the problem shown in FIG. 4(b), the management control unit 6 carries out the aggregation and assignment control of the frequency channels, a result of which is shown in FIG. 4(c). When the first wireless communication unit 2 detects the interference from the external wireless communication equipment (the information terminal 24 and portable information terminal 25 in FIG. 2), the management control unit 6 aggregates the frequency channel of the first wireless communication unit 2 to the frequency channel of the external wireless communication equipment which is the interference source. Furthermore, it allocates the range other than the aggregated frequency channels to the second wireless communication unit 3 and third wireless communication unit 4 as connectable frequency channels. This makes it possible to reserve the connectable frequency channel range of the second wireless communication unit 3 and third wireless communication unit 4 without reducing the transmission efficiency of the wireless communication through the wireless LAN, thereby being able to maintain the transmission efficiency in the entire wireless communication.

Incidentally, as shown in FIG. 4(c), the frequency channel of the first wireless communication unit 2 is aggregated to the frequency channel of the external wireless communication equipment which is the interference source. The reason for this is that if the wireless communication through the wireless LAN detects radio interference with a particular threshold level by the carrier sense function, it stops its communication to avoid interference and/or collision regardless of the interference level, and that the degree of reduction in the transmission efficiency due to the radio interference is the same regardless of whether the frequency channels used by the wireless LAN devices coincide with each other or not in the environment in the vehicle.

As described above, according to the present embodiment 1, it comprises the channel aggregation unit 10 for aggregating, when the interference wave level of the radio interference received from the external wireless communication equipment is not less than the prescribed threshold level, the frequency channel of the wireless communication unit carrying out the wireless communication through the wireless LAN to the same frequency channel as the frequency of the external wireless communication equipment which is the interference source; and the assignment control unit 9 for allocating the frequency channels of the wireless communication units carrying out the wireless communication with a wireless communication scheme other than the wireless LAN to the frequency channels other than the frequency channels aggregated. Accordingly, it can avoid the radio interference from the external wireless communication equipment, can prevent the reduction in the transmission efficiency of the wireless communication through the wireless LAN, and in addition can reserve the usable frequency channel range for the other wireless communication schemes, thereby being able to prevent the reduction in the transmission efficiency.

Furthermore, according to the present embodiment 1, since it is configured in such a manner as to comprise the interference detecting unit 8 for making a decision as to whether the interference wave level from the external wireless communication equipment is not less than the prescribed threshold level or not, and the channel aggregation unit 10 for carrying out the aggregation control of the frequency channels in accordance with the decision result of the interference detecting unit 8, it can reduce the unnecessary interference avoidance operation and realize stable communication.

Embodiment 2

Figure 6:
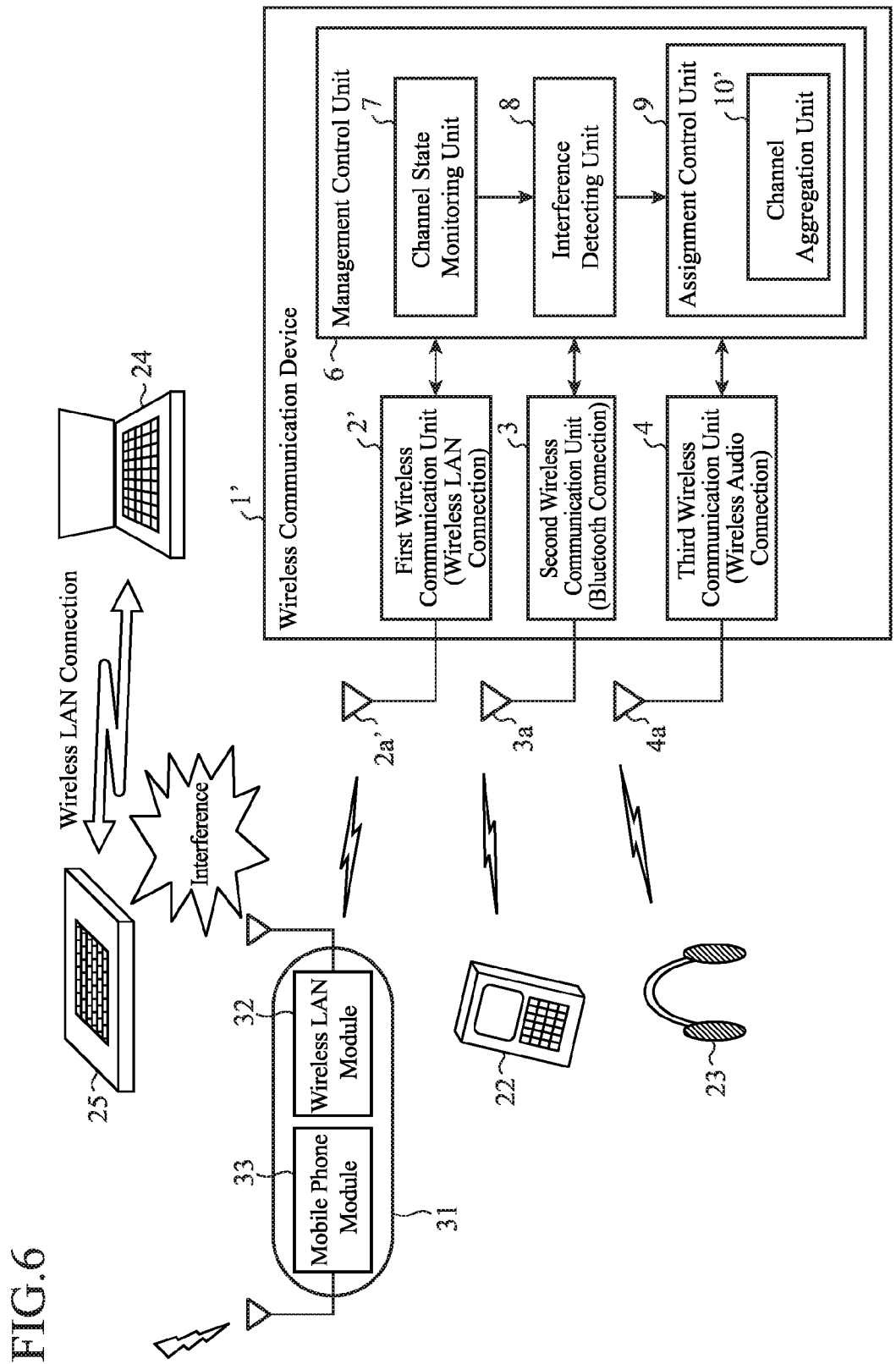
FIG. 6 is a diagram showing an example of application of a wireless communication device of an embodiment 2.

FIG. 6 is a diagram illustrating an example of application of a wireless communication device of an embodiment 2 in accordance with the present invention.

FIG. 6 shows a connection with a wireless router terminal 31 incorporating a wireless LAN module 32 and a mobile phone module 33 instead of the connection with the information terminal 21 shown in FIG. 2. Incidentally, components of the wireless communication device 1' which are the same or correspond to the components of the wireless communication device of the embodiment 1 are designated by the same reference numerals as those of the embodiment 1, and their description will be omitted or simplified in the following description.

A first wireless communication unit 2' establishes a wireless LAN connection with the wireless LAN module 32 of the wireless router terminal 31 and is connectable to the Internet via the mobile phone module 33. In addition to the wireless communication device 1', wireless communication through the wireless LAN is carried out between the information terminal 24 and the portable information terminal 25.

When the first wireless communication unit 2' of the wireless communication device 1' detects radio interference from the wireless LAN connection between the two pieces of the external wireless communication equipment (information terminal 24 and portable information terminal 25), the channel aggregation unit 10' of the management control unit 6 aggregates the frequency channel of the first wireless communication unit 2' and the frequency channel of the wireless LAN module 32 of the wireless router terminal 31 to the frequency channel of the external wireless LAN connection.

Figure 7:
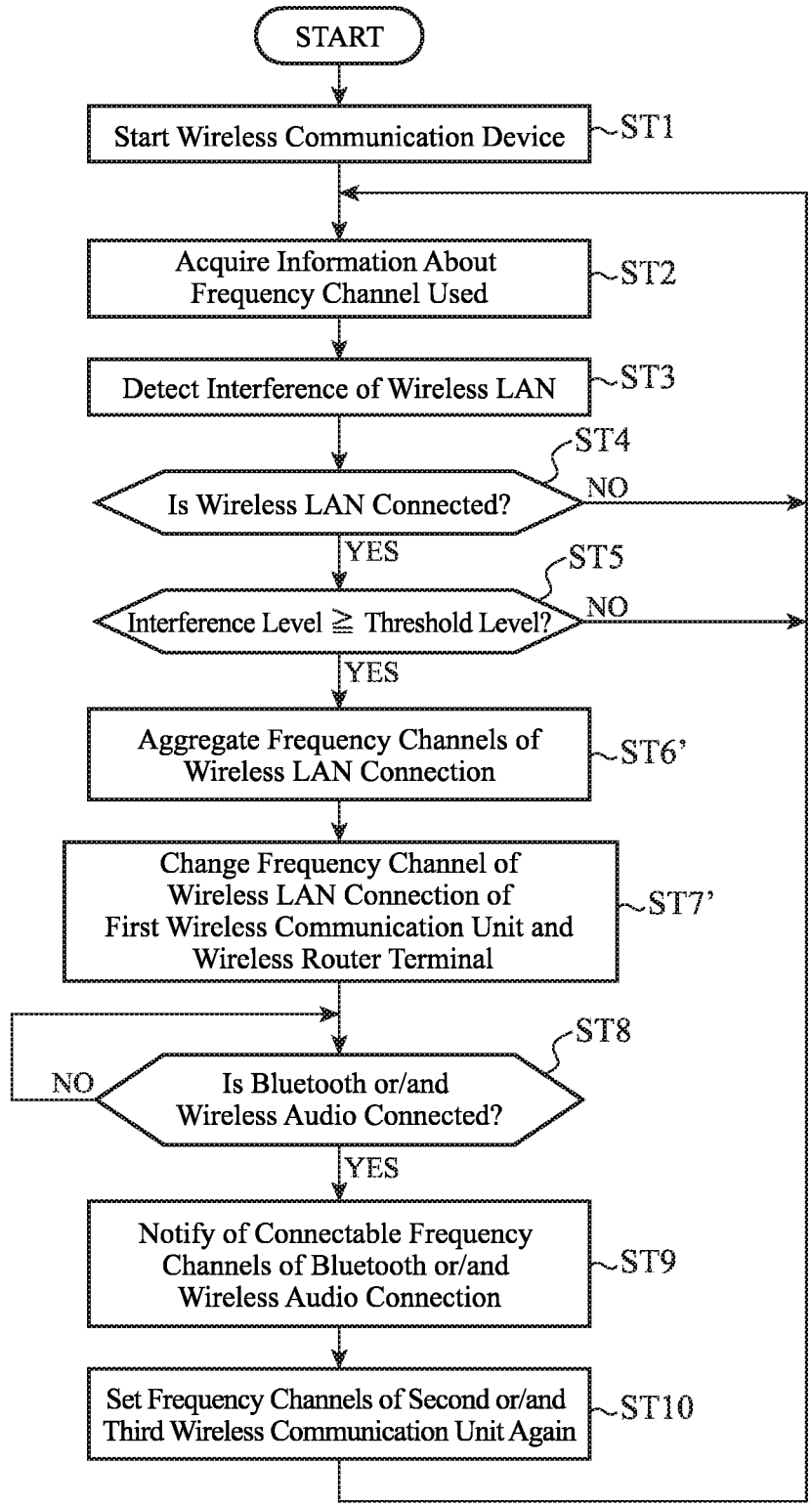
FIG. 7 is a flowchart showing the operation of the wireless communication device of the embodiment 2.

Next, the operation of the wireless communication device of the embodiment 2 will be described with reference to FIG. 7. Incidentally, the same steps as those of the wireless communication device of the embodiment 1 are designated by the same reference symbols as those used in FIG. 3, and their description will be omitted or simplified.

When the interference detecting unit 8 makes a decision at step ST5 that the interference wave level received from the external wireless communication equipment (information terminal 24 and portable information terminal 25 in FIG. 6) is not less than the prescribed threshold level, the channel aggregation unit 10' generates a control instruction to aggregate the frequency channel of the wireless LAN connection to the same frequency channel as the frequency channel of the external wireless communication equipment which is the interference source, and supplies it not only to the first wireless communication unit 2' but also to the wireless LAN module 32 of the wireless router terminal 31 via the first wireless communication unit 2' (step ST6'). The first wireless communication unit 2' and the wireless LAN module 32 change the frequency channel to the frequency channel instructed at step ST6' (step ST7'). After that, in the same manner as the embodiment 1, the assignment control unit 9 allocates the frequency channels other than the aggregated frequency channels to the wireless communication by the Bluetooth or/and wireless audio as connectable frequency channels (step ST9).

As described above, according to the present embodiment 2, since it is configured in such a manner that when the interference wave level of the radio interference received from the external wireless communication equipment is not less than the prescribed threshold level, the channel aggregation unit 10' aggregates the frequency channel of the first wireless communication unit 2' that carries out the wireless communication through the wireless LAN and the frequency channel of the wireless LAN module 32 of the wireless router terminal 31 that carries out the wireless communication with the first wireless communication unit 2' through the wireless LAN to the same frequency channel as the frequency of the external wireless communication equipment which is the interference source, it can avoid the radio interference from the external wireless communication equipment and continue the communication between the wireless communication device 1' and the wireless router terminal 31.

In addition, according to the present embodiment 2, since it is configured in such a manner as to comprise the assignment control unit 9 for allocating the frequency channels of the second wireless communication unit 3 and third wireless communication unit 4 which carry out the wireless communication by the wireless communication schemes other than the wireless LAN to the frequency channels other than the frequency channels to which the first wireless communication unit 2' and the wireless LAN module 32 of the wireless router terminal 31 are aggregated, it can reserve the connectable frequency channel range for the wireless communication schemes other than the wireless LAN and can prevent the reduction in the transmission efficiency.

Embodiment 3

Figure 8:
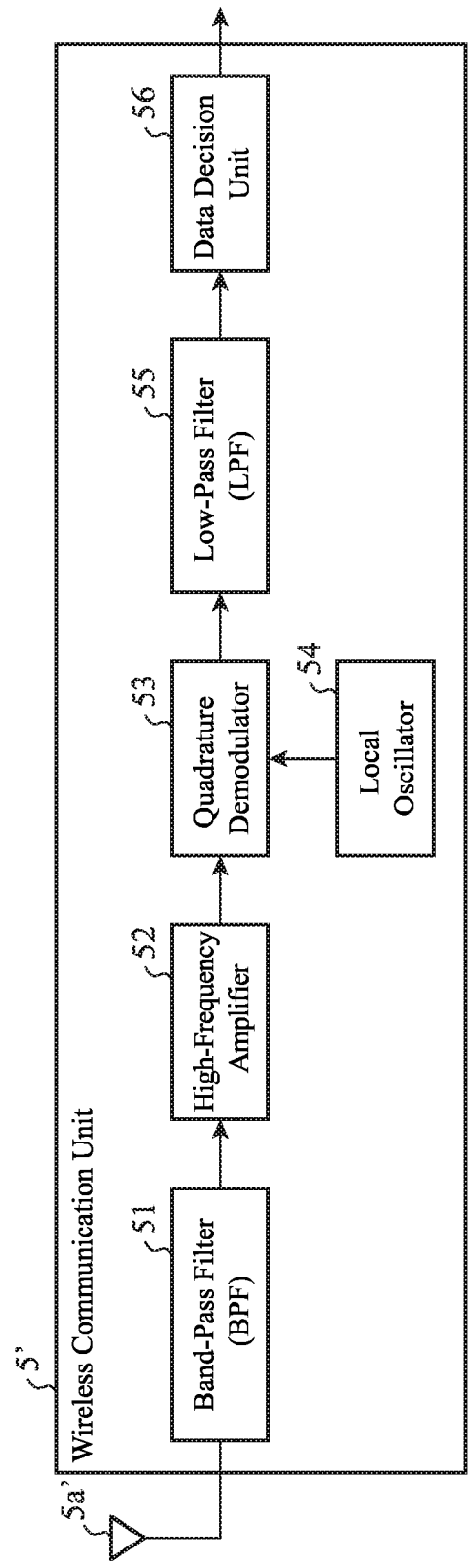
FIG. 8 is a block diagram showing a configuration of a wireless communication unit.

FIG. 8 is a block diagram showing a detailed configuration of a (first to nth) wireless communication unit of the wireless communication device 1 shown in the embodiment 1. The wireless communication unit 5' comprises an antenna 5a', a band-pass filter 51, a high-frequency amplifier 52, a quadrature demodulator 53, a local oscillator 54, a low-pass filter 55, and a data decision unit 56.

The wireless communication unit 5' receives a radio wave with the antenna 5a', passes a 2.4 GHz band signal through the band-pass filter (BPF) 51, and amplifies the signal with the high-frequency amplifier 52. It injects a signal of the frequency channel component to be received into the quadrature demodulator 53 from the local oscillator 54, thereby converting its frequency to a baseband signal. The baseband signal passing through the frequency conversion undergoes a band limit through the low-pass filter (LPF) 55, followed by signal decoding with the data decision unit 56. Incidentally, the low-pass filter 55 attenuates frequency components of the interference source.

The interference tolerance of the wireless communication unit 5' generally increases as the interference source frequency shifts away from the frequency channel used. However, when the low-pass filter 55 attenuates the frequency component of the interference source as mentioned above, depending on the low-pass filter characteristics of impairing its attenuation characteristics in a particular frequency domain, there are some cases where the interference tolerance is reduced even if the interference source frequency is distant, thereby causing communication deterioration.

The characteristics of the low-pass filter 55 will be described with reference to FIG. 9.

FIG. 9(a) shows an output component of the high-frequency amplifier 52, which consists of its own signal component of the wireless communication unit 5' and interference wave components. FIG. 9(b) shows a baseband output of the quadrature demodulator 53, in which the interference wave components are output besides the own signal component of the wireless communication unit 5'. FIG. 9(c) shows a baseband signal after passing through the low-pass filter 55, in which the low-pass filter 55, which has filter pass characteristics denoted by a curve A, attenuates the interference wave components and extracts only the own signal component of the wireless communication unit 5'.

Figure 9:
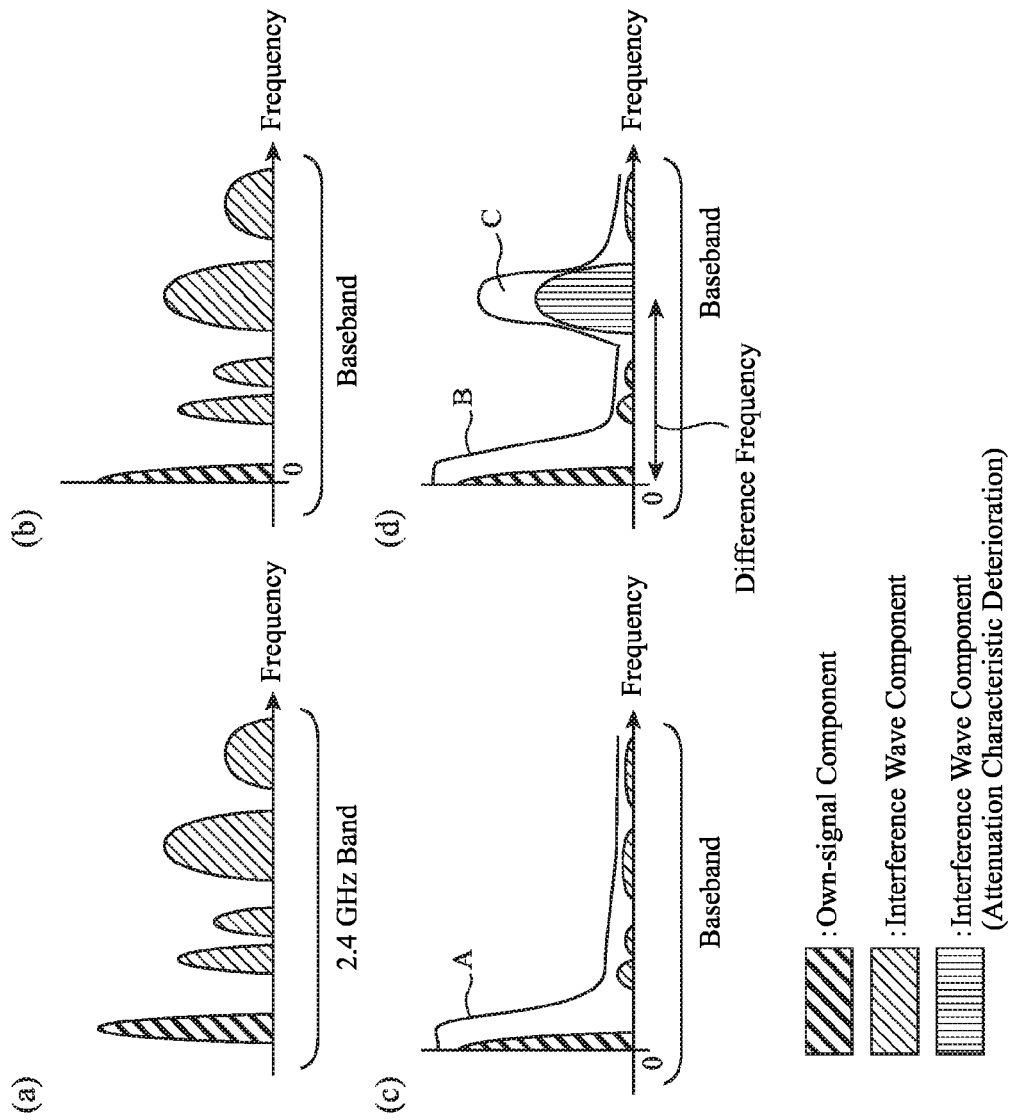
FIG. 9 is a diagram illustrating interference tolerance of the wireless communication unit.

FIG. 9(d) shown another example of the baseband signal after passing through the low-pass filter 55. The low-pass filter 55, which has filter pass characteristics as shown by a curve B, has attenuation characteristics deteriorated in a particular frequency domain (domain C of FIG. 9). Accordingly, when an interference wave component appears in the domain, the low-pass filter 55 cannot sufficiently attenuates it, and it is considered as noise which can cause a decision error in the post-stage data decision unit 56.

Figure 10:
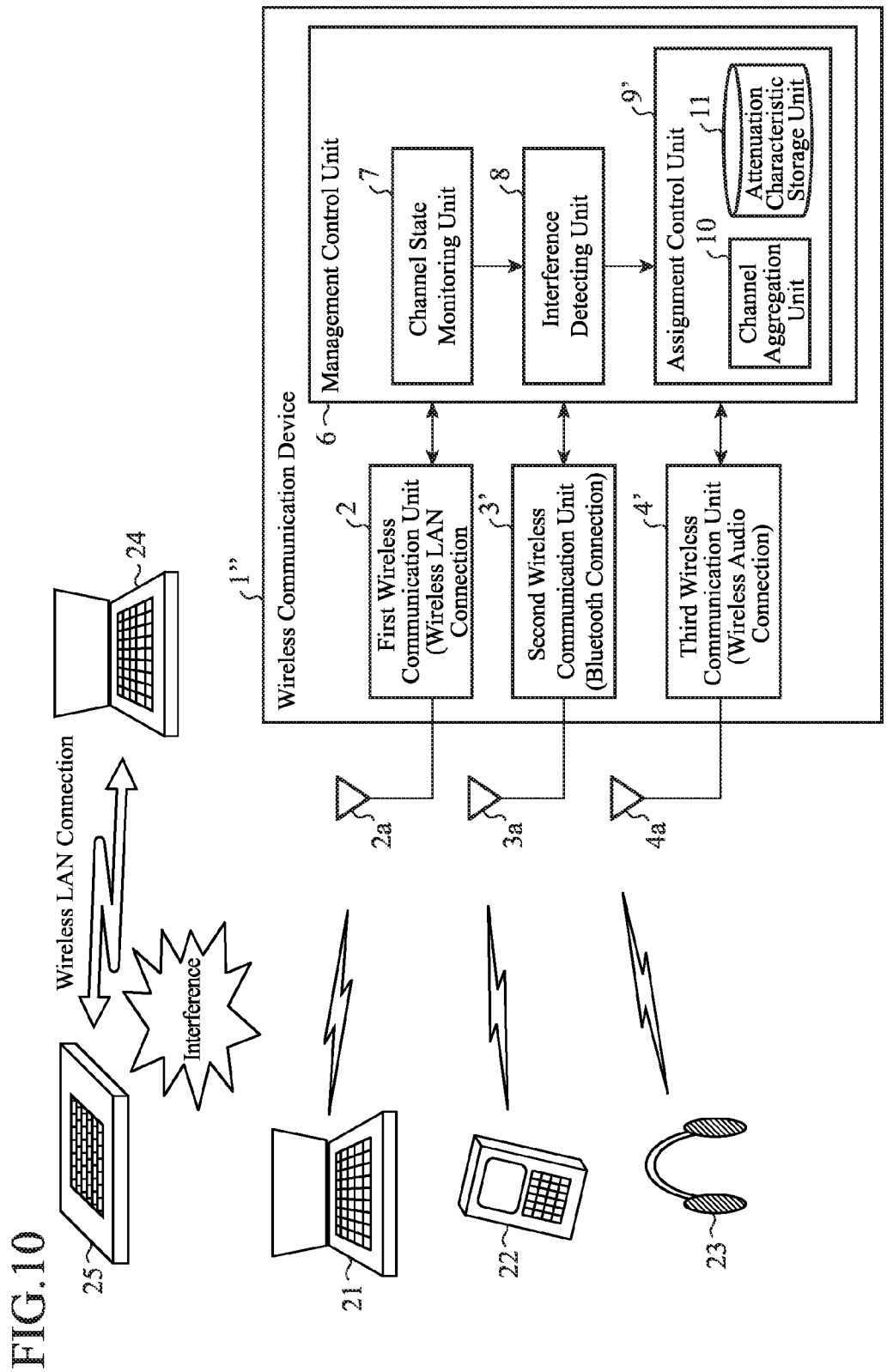
FIG. 10 is a block diagram showing a configuration of a wireless communication device of an embodiment 3.

In the present embodiment 3, a configuration will be described which can reduce the deterioration due to the attenuation characteristics of the interference wave component as shown in FIG. 9(d). FIG. 10 is a block diagram showing a configuration of a wireless communication device of the embodiment 3 in accordance with the present invention. The wireless communication device 1" of FIG. 10 comprises in addition to the wireless communication device 1 of the embodiment 1 shown in FIG. 2 an attenuation characteristic storage unit 11. Incidentally, in the following description, the same or corresponding units to the components of the wireless communication device 1 of the embodiment 1 are designated by the same reference numerals as those used in the embodiment 1 and their description will be omitted or simplified.

The attenuation characteristic storage unit 11 of the assignment control unit 9' stores in advance frequency components which will impair the interference tolerance and which are obtained from the filter pass characteristics of low-pass filters (not shown) of the second wireless communication unit 3' and third wireless communication unit 4'. It is assumed here that the frequency components which will impair the interference tolerance are given in terms of difference frequencies between the own frequency component of the wireless communication unit 5' and the interference frequency component (see FIG. 9(d)). In the assignment control for the second wireless communication unit 3' and third wireless communication unit 4', the assignment control unit 9' carries out assignment control by which it avoids not only the frequency channels aggregated by the channel aggregation unit 10 but also the difference frequencies stored in the attenuation characteristic storage unit 11. According to the assignment control by the assignment control unit 9', the second wireless communication unit 3' and third wireless communication unit 4' establish the frequency channels again.

As described above, according to the present embodiment 3, it is configured in such a manner that it comprises the attenuation characteristic storage unit 11 for storing the frequency components which will impair the interference tolerance and which are obtained from the filter pass characteristics of the low-pass filters, and that the assignment control unit 9' carries out the assignment control by which it avoids not only the frequency channels aggregated by the channel aggregation unit 10 but also the frequency components stored in the attenuation characteristic storage unit 11. Accordingly, it can reduce the communication deterioration caused by the filter pass characteristics, thereby being able to improve the transmission efficiency.

Incidentally, it is to be understood that a free combination of the individual embodiments, variations of any components of the individual embodiments or removal of any components of the individual embodiments are possible within the scope of the present invention.

INDUSTRIAL APPLICABILITY

A wireless communication device in accordance with the present invention can be utilized for improving communication quality of a wireless communication device or a wireless communication system which is used in a small closed space.

DESCRIPTION OF REFERENCE SYMBOLS 1, 1', 1" wireless communication device; 2, 2' first wireless communication unit; 2a, 2a', 3a, 4a, 5a, 5a' antenna; 3, 3' second wireless communication unit; 4, 4' third wireless communication unit; 5, 5' nth wireless communication unit; 6 management control unit; 7 channel state monitoring unit; 8 interference detecting unit; 9, 9' assignment control unit; 10, 10' channel aggregation unit; 11 attenuation characteristic storage unit; 21, 24 information terminal; 22 mobile terminal; 23 wireless headphone; 25 portable information terminal; 31 wireless router terminal; 32 wireless LAN module; 33 mobile phone module; 51 band-pass filter; 52 high-frequency amplifier; 53 quadrature demodulator; 54 local oscillator; 55 low-pass filter; 56 data decision unit; A, B filter pass characteristics; C attenuation characteristic impaired domain.

What is claimed is:

1. A wireless communication device that carries out wireless communication with a plurality of pieces of communication equipment, the wireless communication device comprising:
   a wireless LAN communication unit with a first antenna for carrying out wireless communication with the communication equipment through a wireless LAN, and for detecting an interference wave due to wireless communication between external devices through a wireless LAN to obtain a frequency channel of the interference wave;
   a wireless communication unit with a second antenna for carrying out wireless communication based on a communication scheme using a same frequency band as a frequency band of the communication equipment and the wireless LAN;
   a channel aggregation unit for changing a frequency channel of the wireless LAN communication unit, for use in carrying out the wireless communication with the communication equipment, to be the same frequency channel as the frequency channel employed by the external devices causing the interference wave which the wireless LAN communication unit obtains; and
   an assignment control unit for changing a frequency channel of the wireless communication unit in response to the changing of the frequency channel of the wireless LAN communication unit by the channel aggregation unit, the assignment control unit changing the frequency channel of the wireless communication unit from coinciding with the frequency channel employed by the external devices to coincide with the previous frequency channel of the wireless LAN communication unit prior to being changed by the channel aggregation unit.

2. The wireless communication device according to claim 1, further comprising:
   an interference detecting unit for deciding on whether the interference wave due to the wireless communication through the wireless LAN deteriorates communication quality of the wireless communication through the wireless LAN of the wireless LAN communication unit, wherein
   the wireless LAN communication unit obtains an interference level of the interference wave;
   the interference detecting unit decides on whether the interference level of the interference wave the wireless LAN communication unit obtains is not less than a threshold or not; and
   the channel aggregation unit sets, when the interference detecting unit decides that the interference level of the interference wave is not less than the threshold, the frequency channel of the wireless LAN communication unit at the same frequency channel as the frequency channel of the interference wave the wireless LAN communication unit obtains.

3. The wireless communication device according to claim 1, further comprising:
  a storage unit for storing a frequency channel with a low interference tolerance for the interference wave due to the wireless communication through the wireless LAN in a communication scheme that employs a same frequency band as the wireless LAN, wherein
  the assignment control unit allocates the frequency channel of the wireless communication unit to a frequency channel other than the frequency channel with the low interference tolerance stored in the storage unit.

4. A wireless communication system including a plurality of pieces of communication equipment and a wireless communication device for carrying out wireless communication with the plurality of pieces of the communication equipment, wherein the wireless communication device comprises:
  a wireless LAN communication unit with a first antenna for carrying out wireless communication with the communication equipment through a wireless LAN, and for detecting an interference wave due to wireless communication between external devices through a wireless LAN to obtain a frequency channel of the interference wave;
  a wireless communication unit with a second antenna for carrying out wireless communication based on a communication scheme using a same frequency band as a frequency band of the communication equipment and the wireless LAN;
  a channel aggregation unit for changing a frequency channel of the wireless LAN communication unit and a frequency channel of the communication equipment, for use in carrying out the wireless communication through the wireless LAN among the plurality of pieces of the communication equipment, to be the same frequency channel as the frequency channel employed by the external devices causing the interference wave which the wireless LAN communication unit obtains; and
  an assignment control unit for changing a frequency channel of the wireless communication unit in response to the changing of the frequency channel of the wireless LAN communication unit by the channel aggregation unit, the assignment control unit changing the frequency channel of the wireless communication unit from coinciding with the frequency channel employed by the external devices to coincide with the previous frequency channel of the wireless LAN communication unit prior to being changed by the channel aggregation unit.

* * * * *